May 12, 1970            D. F. HELM            3,511,967
COATED ARC WELDING ELECTRODE FOR MINIMIZING POROSITY OF
THE WELD METAL AT THE START OF WELDING
Filed Oct. 3, 1968            2 Sheets-Sheet 1

DAVID F. HELM
INVENTOR
BY
*Edward Hooper III*

HIS ATTORNEY

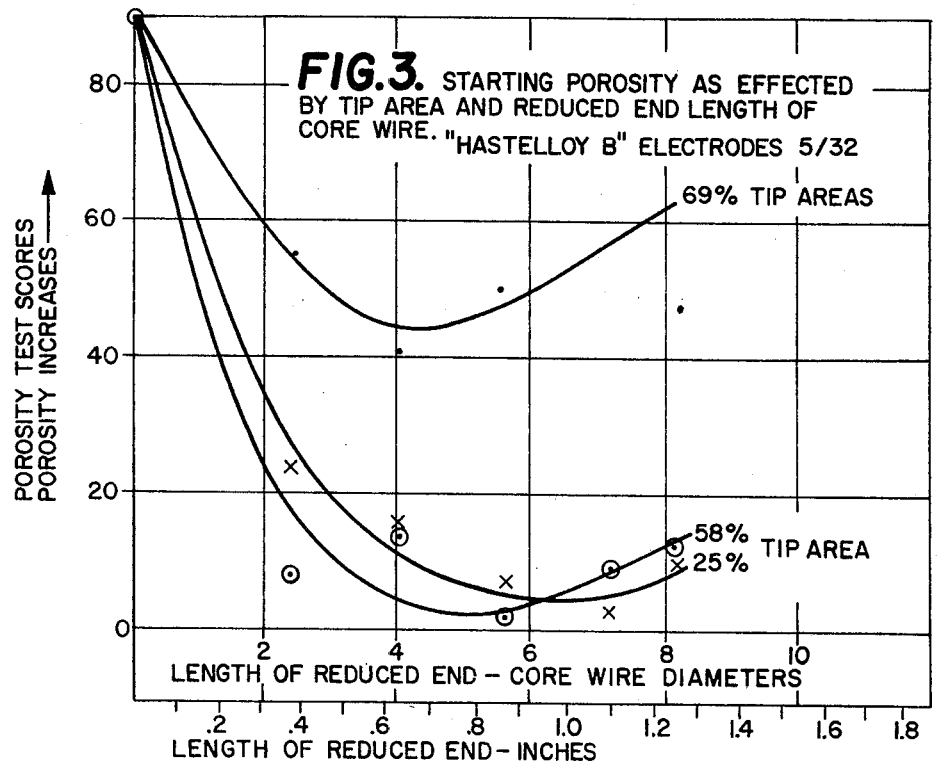
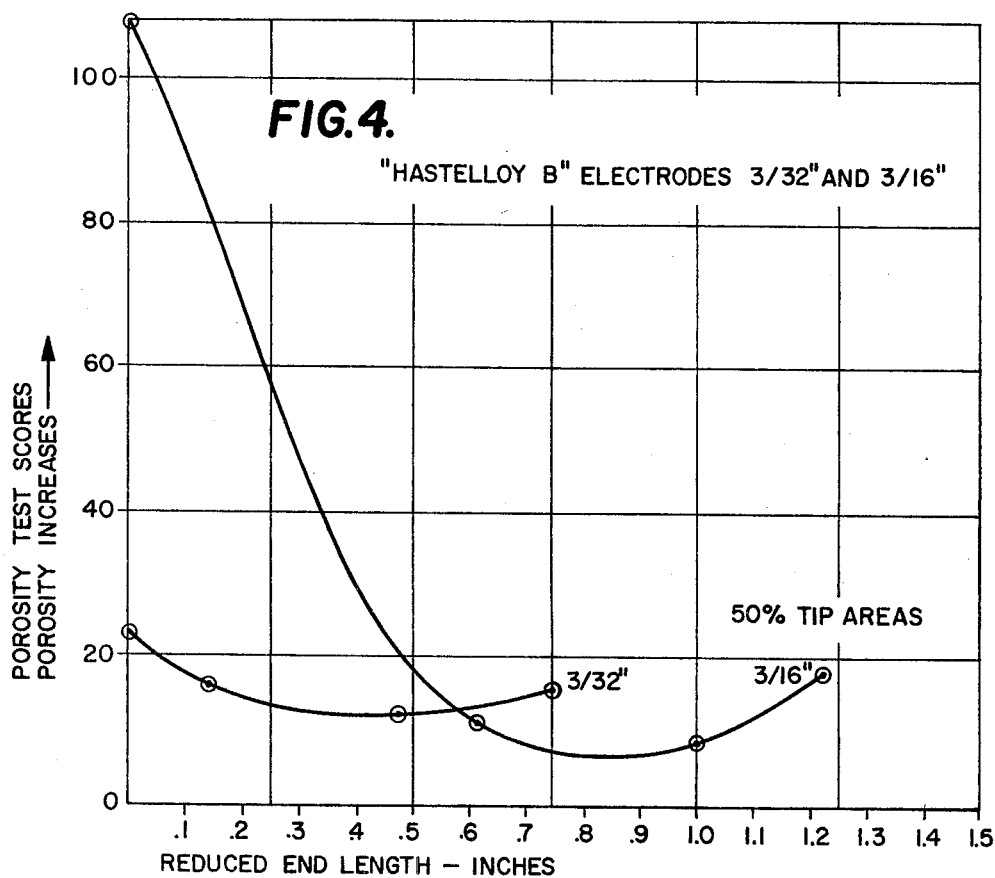

United States Patent Office 3,511,967
Patented May 12, 1970

3,511,967
COATED ARC WELDING ELECTRODE FOR MINIMIZING POROSITY OF THE WELD METAL AT THE START OF WELDING
David F. Helm, Mount Lebanon, Pa., assignor to The McKay Company, Pittsburgh, Pa., a corporation of Pennnsylvania
Filed Oct. 3, 1968, Ser. No. 764,686
Int. Cl. B23k 35/22
U.S. Cl. 219—146          5 Claims

ABSTRACT OF THE DISCLOSURE

A coated arc welding electrode for minimizing porosity of the weld metal at the start of welding comprising a core wire having a body of uniform cross-sectional area and a starting end portion of reduced cross-sectional area at one end of the body, the starting end portion having a length between about two times the diameter of the body of the core wire and about 1.25 inches, preferably between about two diameters and about .8 inch, the end surface or tip of the starting end portion having a cross-sectional area between about twenty and about seventy, preferably between about twenty-five and about sixty, percent of the cross-sectional area of the body, the core wire having thereon a coating which is of uniform outside diameter except that the end surface of the coating extends at an angle outwardly from the tip of the core wire and generally toward the body of the core wire. The coating preferably is a stainless-low hydrogen type coating. The starting end portion of the core wire is preferably of truncated cone shape.

---

This invention relates to a consumable flux coated arc welding electrode for minimizing porosity of the weld metal at the start of welding. Such electrodes may be employed in shielded metal-arc welding.

The invention is especially applicable, although not limited, to electrodes used to deposit stainless steel alloys, nickel base alloys and mild and alloy steels, particularly those with relatively high strength levels. While the principles of the invention may be carried out with any coating, because they are now almost exclusively used for obtaining these highest quality weld deposits the electrode coatings usually employed are of the type known variously as carbonate-fluoride, basic or stainless-low hydrogen coatings. They produce high quality metal by means of good slag protection and carefully selected deoxidation metal and alloy additions and form the deposit metal under a protective gas shield which originates as carbon dioxide produced by the thermal decomposition of metallic carbonates in the coating such as limestone.

Coatings of the type above referred to which employ fluorides as fluxing agents for the carbonate residues have long been used, especially for highly alloyed deposits such as the stainless steels. When made without hydrogen containing materials and high baked for very good drying they have also in recent years come to be known as low hydrogen coatings and have been especially suitable for low alloy and unalloyed ferritic steel analyses as well. Many of these are metals of which the maximum perfection is desired. It is not unusual to find electrode deposits which are satisfactory except for high starting porosity. I have solved the problem and provided an electrode which minimizes porosity of the weld metal at the start of welding.

Sensitivity to starting porosity in general is a function of many factors among which are:

(1) Electrical conditions of welding, especially current density on the electrode core wire.

(2) Temperature gradient in the base metal under the weld pool.

(3) Base metal plate thickness.

(4) Manipulation techniques employed by the weldor.

(5) Moisture content of the electrode.

(6) Coating ingredients, especially deoxidation metals.

(7) Volume of shielding gas and slag per unit of weld metal.

(8) Coating to core wire volume ratio.

All of these factors work together to produce a balance and compared with the later portions of the electrode some of the factors in this balance are distorted as the starting portion of the electrode is consumed.

In the employment of a welding electrode the weldor demands that each electrode make a metal-to-metal contact which will instantly initiate the arc when the electrode is touched to the workpiece at the spot where he wishes to start the weld bead. He insists that the arc start without tilting the electrode back and forth or scratching it along the workpiece, and electrodes which fail in this requirement are not salable. Therefore, the conventional manual coated electrode has a straight uniform core wire of constant diameter and a straight uniform coating of constant thickness except where stripped away for gripping by the holder and where ground away or "brushed back" at the striking end at an angle typically about twenty to forty-five degrees to facilitate easy striking of the arc. The removal of this small amount of coating is demanded by the weldor for his convenience and, in combination with the fact that the coating burns or melts off at an acute angle to the core wire to form a "cup" around the arc, results in less coating being consumed or melted per increment of length of core wire at the starting end portion than for the balance of the electrode. Because of this low coating-to-core wire melting ratio the weld metal initially deposited is undersupplied with those contributions which the coating is designed to make. Since the coating shields the arc and weld metal from porosity inducing contamination this coating deficiency tends to raise the porosity of the weld metal at the start of the weld.

I have found that in many arc welding electrode situations the threshold for the occurrence of porosity in the weld bead at the beginning of welding can be greatly increased by a simple change in the contour of the electrode core wire which increases the current density in the starting end section.

Other details, objects and advantages of the invention will become apparent as the following description of a present preferred embodiment thereof proceeds.

In the accompanying drawings I have shown a present preferred embodiment of the invention in which.

FIG. 3 is a set of curves illustrating graphically the results of welding tests using 5/32 inch electrodes having different tip areas in terms of percentage of the cross-sectional areas of the core wire, plotting the length of the reduced end of the electrode against porosity of the weld metal; and FIG. 4 is a set of curves similar to those of FIG. 3 illustrating the benefits of my invention in connection with 3/32 and 3/16 inch diameter electrodes.

Figure 1:
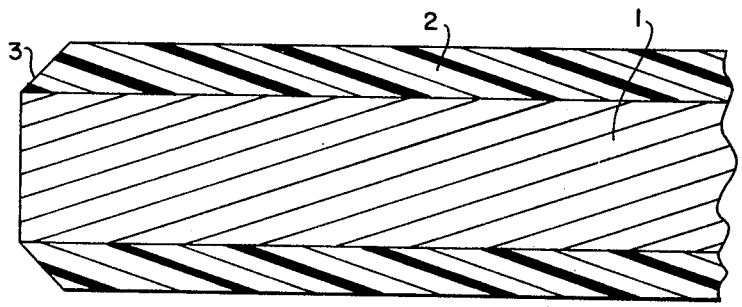
FIG. 1 is a diagrammatic cross-sectional view of a prior art electrode as hereinafter explained.

FIG. 1 shows the striking end of an electrode of the prior art, the balance of the electrode not being of present interest and not being shown. The core wire is designated 1 and the coating is designated 2. The coating has been brushed back at 3 for ease of striking.

Figure 2:
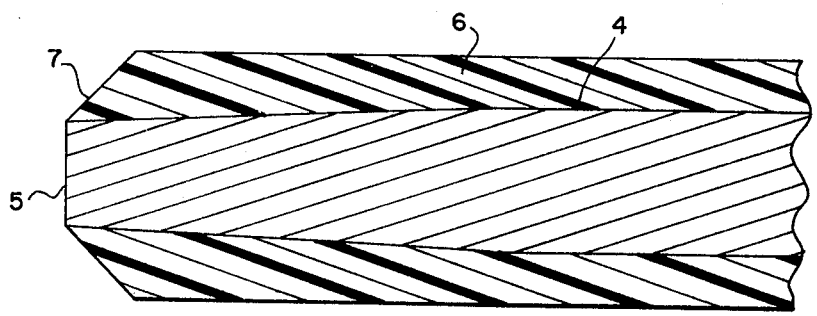
FIG. 2 is a diagrammatic cross-sectional view of one form of my improved electrode as hereinafter explained.

FIG. 2 shows the striking end of my improved electrode. The core wire is designated 4 and the coating is designated 6. The coating has been brushed back at 7 at a conventional angle for ease of striking. The core wire is reduced at the striking or starting end portion terminating in a striking tip 5. The reduced starting end portion of the core wire is shown as being of truncated cone shape. The coating is of uniform outside diameter except that the end surface of the coating extends at an angle outwardly from the tip of the core wire and generally toward the body of the core wire.

By putting a reduced end section such as a taper on the striking end of an electrode core an extruded coating is necessarily made thicker in this region, since the overall diameter remains constant. When such an electrode is operated at its usual electrical amperage the current per unit cross section of core wire starts out at a value greatly over normal and metal temperatures higher than normal are produced until the reduced section is used up. This concentration of energy is most valuable in establishing the welding pool which must be built up on the cold plate and whose initial fast freezing rate tends to trap gas bubbles liberated by the metal before they reach the surface. A short time after the start of the weld the accumulating heat slows down the metal freezing rate to a steady rate which remains approximately constant throughout the balance of the electrode's use. It must be emphasized that an objective of the invention is to obtain especially favorable metal solidification conditions for a small number of critical seconds only.

A typical stainless-low hydrogen coated electrode of average size will be consumed at a rate of about 11.5 inches per minute; the first ½ inch therefore is consumed in about 2.6 seconds, the first inch in about 5.2 seconds and the first 2 inches in about 10.4 seconds. These first seconds constitute the critical interval when starting porosity threatens during establishment of the working weld metal pool and to minimize it especially favorable conditions must be produced in the case of analyses which tend to be porous.

The first inch or so of electrode consumption presents a special situation which is not duplicated during the consumption of the subsequent inches, which are nearly equivalent to each other. The need for especially favorable conditions prevails at the start, remains acute for a small number of seconds and then disappears rapidly. These special conditions are favored by a reduced end core wire section such as a beveled taper and beneficial effects have been found with such reduced end sections which are consumed in time intervals ranging from about 1 or 2 seconds to about 7 seconds.

Electrodes gradually tapered from end to end while commercially impractical have been proopsed. However, an electrode with an end to end taper cannot take care of the rapidly changing conditions which occur in the vicinity of the electrode starting tip and could only do so by being furnished with a further reduced end section of the type herein described.

I provide a practical method of minimizing electrode starting porosity without altering the main portion of a standard electrode or its operating conditions in any way. If a reduced end section on the core wire is secured by metal removal then the least metal removal which will accomplish the purpose is desired.

Experience has shown that 3/32 inch electrodes, the smallest common size, are less prone to starting porosity than 1/8, 5/32 or 3/16 inch sizes and that the large 1/4 inch electrodes are usually employed downhand under welding conditions that favor reduced porosity. Therefore it is the intermediate average electrodes such as the 5/32 inch size which stand most in need of assistance and which benefit most from this invention. With this size electrode significant improvements in starting porosity are shown with reduced end sections as short as about two core diameters in length: favorable results continue through reduced ends about eight core diameters or about 1¼ inches, and then diminish. The practicality of 1¼ inches as an upper limit for the length of the reduced end is supported by another consideration. Each size of a conventional electrode produces a characteristic size of weld pool and weld bead. To fill a weld pool, for example in the fillet position, about the same length of core wire metal is required for each electrode in the common size range of 3/32 to 1/4 inch. No more than about 1 inch, equal to about 4 to 11 core diameters, can be put into the weld pool before the weldor must move forward and allow freezing to take place. For a reduced end core wire electrode this length increases to about 1¼ inches because of the reduced core volume.

While some improvement may persevere in an electrode with a reduced end core wire section more than about 1¼ inches in length, after this point the starting portion of a welding bead will usually have been completed and additional length of core wire modification can no longer influence the initial result. The reduced core section of the electrode has served its purpose and to continue it farther only serves to reduce the potential efficiency of which the electrode is capable. Furthermore, from an economic standpoint the porosity advantages resulting from a core wire preparation become less attractive as this preparation becomes longer and more difficult to make.

Experience with reduced end section core wires has shown that tip areas approximately 20 to 70% of the core wire area are the most effective and reliable for reducing porosity at the weld start. The core tip and reduced section length should be selected with respect to each other as well as to the wire analysis and coating type. Small core tips should be coupled with short reduced end lengths to prevent arc quenching produced when a core wire tip too long and too small melts out rapidly leaving a tube of unmelted coating thus making the arc too long to be stable. Thus the smaller the tip area the shorter the time that is available for securing the benefits of increased current density on the core wire. Therefore for the most reliable porosity results the tip area should not be smaller than about 20% of the core wire area and not shorter than about two core diameters. The proportioning of the reduced end section preferred for a given electrode type and size can easily be determined by one skilled in the art.

My improved electrode can readily be produced by the standard methods of coating by extrusion and for ease of striking may receive the standard coating brush-back at the tip.

While the diminished core wire portion of an electrode is being consumed under a higher than normal current density, the extra volume of coating adds an extra volume of shielding gas together with increased metal powder deoxidizer per unit of weld metal which may be helpful.

It is to be borne in mind that porosity is a statistical property and probably no arc welding electrode can ever be guaranteed to produce a porosity free metal. A large number of factors contribute to the conditions which govern the porosity of weld metal. When one or more factors are very unfavorable a reduced end core wire may not compensate enough to remedy starting porosity. But when conditions are not too unfavorable a favorably chosen reduced end section can add the improvement necessary to make the electrode commercially acceptable. Likewise the use of a reduced end section such as a beveled taper can render a good electrode still more resistant to the hazard of starting porosity which is always present and which poor manipulation by an inexperienced weldor can increase.

Reduced end section core wires produced by taper beveling the wire to form a truncated conical tip and with coatings ground or brushed back at the striking ends were employed in the test work next described.

One of the more difficult analyses from the standpoint of starting porosity in weld beads is "Hastelloy B," a corrosion resistant alloy principally of nickel and molybdenum. The improvements which can be secured in welds made with this material serve to illustrate this invention. Table 1 and FIG. 3 show experimental results for 5/32 inch standard construction electrodes coated with a titania modified carbonate-fluoride low hydrogen stainless type coating No. K-668 which were compared with other electrodes identical in every way except that they had reduced end core wire construction.

TABLE 1.—STARTING POROSITY TESTS "HASTELLOY B" COATED ELECTRODES—5/32"

| Taper length, inches | Taper length, core wire diameters | Tip diameter, inches | Tip in core diameter | Tip area as percent core area | Porosity score |
|---|---|---|---|---|---|
| Unmodified electrode | | | | | 91 |
| .375 | 2.4 | | | | 24 |
| .625 | 4.0 | | | | 15 |
| .875 | 5.6 | .078 | .5 | 25 | 7 |
| 1.125 | 7.2 | | | | 3 |
| 1.250 | 8.2 | | | | 10 |
| .375 | 2.4 | | | | 8 |
| .625 | 4.0 | | | | 14 |
| .875 | 5.6 | .110 | .76 | 58 | 1 |
| 1.125 | 7.2 | | | | 9 |
| 1.250 | 8.2 | | | | 12 |
| .375 | 2.4 | | | | 55 |
| .625 | 4.0 | | | | 40 |
| .875 | 5.6 | .130 | .83 | 69 | 50 |
| 1.125 | 7.2 | | | | 75 |
| 1.250 | 8.2 | | | | 47 |

Three taper lengths and three core wire tip diameters were selected for comparison with each other for effectiveness in reducing starting porosity. A standard test program was adopted under which single, double and triple layer test beads were deposited on 1/4 inch flat "Hastelloy B" plates and radiographed for internal porosity and were scored by assigning arbitrary values of 1, 2 and 3 respectively to the small, medium and large holes which were found. The beads were deposited without the customary aid of welding back through the starting portion. Under these conditions the standard electrodes produced a total score of 91. All the reduced end core wire electrodes were superior to the standard product, some conformations scoring better than others. The better tapered electrodes gave bead starts of commercial acceptability, the unmodified electrodes did not, although both produced low porosity metal in all but the starting portions of the beads.

FIG. 3 shows that electrode core ends reduced to 69% of normal produced definite improvement but that ends reduced to 58% and 25% were much better. Reduced end lengths of 3/8 inch or 2.4 core diameters were effective with about four to six core diameters showing the maximum effect.

TABLE 2.—STARTING POROSITY TESTS "HASTELLOY B' COATED ELECTRODES—5/32" AND 3/16"

| Taper length, inches | Taper length, core wire diameters | Tip diameter, inches | Tip in core diameters | Tip area as percent of core area | Porosity score |
|---|---|---|---|---|---|
| 5/32" size, Unmodified electrodes | | | | | 22 |
| .125 | 1.3 | | | | 15 |
| .440 | 4.7 | .88 | .7 | 50 | 11 |
| .750 | 8.0 | | | | 17 |
| 3/16" size, Unmodified electrodes | | | | | 112 |
| .625 | 3.0 | | | | 11 |
| 1.0 | 5.3 | .131 | .7 | 50 | 9 |
| 1.375 | 7.3 | | | | 18 |

Table 2 whose data are graphically presented in FIG. 4 illustrates the benfits of reduced core wire end sections employed on 5/32 and 3/16 inch size electrodes. Again, "Hastelloy B" coated electrodes of various taper lengths were employed, this time with tip areas 50% of standard. Both sizes of electrodes using coating No. K-668 when welded and scored as before showed improved start porosity in the beads.

The data of FIGS. 3 and 4 indicate that while a reduced end length of about two core diameters to about .8 inch may combine the most benefits with simplicity of prepration the length may vary from about two core diameters to 1.25 inches. The tip area of the reduced end has an effective and practical range of about 20 to 70% of the unmodified core wire with a preferred range of about 25 to 60%. Smaller areas are indicated as effective against porosity but are hazardous because of arc quench-out unless made short and therefore too brief in beneficial effect.

While a reduced end core wire in the form of a truncated cone was employed in the tests described the effect can also be secured by other shapes which reduce the cross sectional area of the tip such as through single or multiple cylindrical steps or with the use of deep indentations which reduce this cross section area.

While I have shown and described a present preferred embodiment of the invention it is to be distinctly understood that the invention is not limited thereto but may be otherwise variously embodied within the scope of the following claims.

I claim:

1. A consumable flux coated arc welding electrode for minimizing porosity of the weld metal at the start of welding comprising a core wire having a body portion of uniform cross-sectional area and a starting end portion of reduced cross-sectional area at one end of the body portion, the starting end portion of the core wire having a length at least two times the diameter of the body portion of the core wire and no longer than 1.25 inches, the arc-starting end surface of the starting end portion of the core wire having a cross-sectional area between about twenty and about seventy percent of the cross-sectional area of the body portion of the core wire, the core wire having thereon a flux coating which is of uniform outside diameter except that the end surface of the coating is brushed back at a conventional angle outwardly from the tip of the core wire and generally toward the body of the core wire.

2. A consumable flux coated welding electrode for minimizing porosity of the weld metal at the start of welding as claimed in claim 1 in which the coating is a stainless-low hydrogen type flux coating.

3. A consumable flux coated arc welding electrode for minimizing porosity of the weld metal at the start of welding as claimed in claim 1 in which the starting end portion of the core wire has a length at least two times the diameter of the body portion of the core wire and no longer than .8 inch and the arc-starting end surface of the starting end potrion of the core wire has a cross sectional area between about twenty-five and about sixty percent of the cross-sectional area of the body portion of the core wire.

4. A consumable flux coated arc welding electrode for minimizing porosity of the weld metal at the start of welding as claimed in claim 2 in which the starting end portion of the core wire is of truncated cone shape.

5. A consumable flux coated arc welding electrode for minimizing porosity of the weld metal at the start of welding as claimed in claim 3 in which the starting end portion of the core wire is of truncated cone shape.

References Cited

UNITED STATES PATENTS 3,231,332   1/1966   Jones et al. _____ 219—146
3,370,152   2/1968   Rolnick _____ 219—146

JOSEPH V. TRUHE, Primary Examiner

L. A. ROUSE, Assistant Examiner

PO-1050
(5/69)

UNITED STATES PATENT OFFICE
CERTIFICATE OF CORRECTION

Patent No. 3,511,967           Dated May 12, 1970

Inventor(s) DAVID F. HELM

It is certified that error appears in the above-identified patent and that said Letters Patent are hereby corrected as shown below:

Column 2, line 60, "areas" should be --area--. Column 3, line 51, "proopsed" should be --proposed--. Claim 2, line 1, after "coated" insert --arc--.

SIGNED AND
SEALED
SEP 1 - 1970

(SEAL)
Attest:

Edward M. Fletcher, Jr.

Attesting Officer

WILLIAM E. SCHUYLER, JR.
Commissioner of Patents